United States Patent
Wagstaff

(10) Patent No.: US 10,594,614 B2
(45) Date of Patent: Mar. 17, 2020

(54) CONTEXT AWARE ROUTING

(71) Applicant: Bsquare Corp., Bellevue, WA (US)

(72) Inventor: David Wagstaff, Lake Forest, CA (US)

(73) Assignee: Bsquare Corp., Bellevue, WA (US)

( * ) Notice: Subject to any disclaimer, the term of this patent is extended or adjusted under 35 U.S.C. 154(b) by 0 days.

(21) Appl. No.: 15/985,471

(22) Filed: May 21, 2018

(65) Prior Publication Data

US 2018/0337864 A1 Nov. 22, 2018

Related U.S. Application Data

(60) Provisional application No. 62/508,557, filed on May 19, 2017.

(51) Int. Cl.
*H04L 12/859* (2013.01)
*H04L 12/863* (2013.01)
(Continued)

(52) U.S. Cl.
CPC ........ *H04L 47/2475* (2013.01); *H04L 45/306* (2013.01); *H04L 47/125* (2013.01);
(Continued)

(58) Field of Classification Search
CPC ... H04L 47/2475; H04L 47/622; H04L 47/20; H04L 47/125; H04L 45/54; H04L 45/302; H04L 45/306; H04L 67/327; H04L 47/24; H04L 47/2441; H04L 47/80; H04L 47/801; H04L 47/803; H04L 47/805; H04L 47/806; H04L 47/808; H04L 47/821; H04L 45/30; H04L 45/3065; H04L 45/38; H04L 45/50; H04L 45/74; H04L 45/745; H04L 29/06585; H04L 29/12207; H04L 47/34; G06F 7/76; G06F 9/50; H04W 28/065
See application file for complete search history.

(56) References Cited

U.S. PATENT DOCUMENTS 6,807,581 B1 * 10/2004 Starr .................... H04Q 3/0029
709/227
7,237,036 B2 * 6/2007 Boucher ............... G06F 13/385
370/396

(Continued)

*Primary Examiner* — Un C Cho
*Assistant Examiner* — Lalita W Pace
(74) *Attorney, Agent, or Firm* — Rowan TELS LLC

(57) ABSTRACT

A method for context-aware routing including receiving raw data; configuring a message handler with a routing table; determining data information flow with a remediation; utilizing a rule speed estimator and an orchestration speed; generating a selection signal with a resolution module to operate a selector to process the raw data; ordering the raw data with a sequencer to set a data processing order; processing the raw data; determining and sending a response message. A system for a context aware router involves service abstraction layers receiving input control signals; a router transforming the input control signals into message control signals; a rules interpretation component transforming the message control signals into rule control signals; a network abstraction layer receiving the message control signals and transforming the message control signals into a network control signal; and sending the network control signal to affect a machine state of one or more machines.

5 Claims, 10 Drawing Sheets

(51) Int. Cl.
*H04L 12/813* (2013.01)
*H04L 12/803* (2013.01)
*H04L 12/725* (2013.01)
*H04L 12/741* (2013.01)

(52) U.S. Cl.
CPC ............ *H04L 47/20* (2013.01); *H04L 47/622* (2013.01); *H04L 45/302* (2013.01); *H04L 45/54* (2013.01)

(56) References Cited

U.S. PATENT DOCUMENTS

| | | | |
|---|---|---|---|
| 2003/0072318 A1* | 4/2003 | Lam | H04L 45/04 370/428 |
| 2003/0103465 A1* | 6/2003 | Counterman | H04L 47/10 370/252 |
| 2003/0212818 A1* | 11/2003 | Klein | H04L 51/12 709/238 |
| 2004/0042456 A1* | 3/2004 | Dittmann | H04L 47/24 370/392 |
| 2006/0215581 A1* | 9/2006 | Castagnoli | H04L 41/0663 370/254 |
| 2009/0141671 A1* | 6/2009 | Miyagi | H04W 8/183 370/328 |
| 2015/0078386 A1* | 3/2015 | Jackson | H04L 45/7453 370/392 |
| 2017/0353367 A1* | 12/2017 | Slaight | H04L 43/04 |
| 2018/0109464 A1* | 4/2018 | Chen | H04L 41/5009 |

* cited by examiner

CONTEXT AWARE ROUTING

CROSS REFERENCE TO RELATED APPLICATIONS

This application claims the benefit of U.S. provisional patent application Ser. No. 62/508,557, filed on May 19, 2017, the contents of which are incorporated by reference herein in their entirety.

BACKGROUND

Existing message routing systems rely on message routing queues to deliver messages based on routing instructions using conditional logic and/or an orchestration algorithm for controlling devices to deliver messages to intended devices. While these routing systems are able to deliver low volumes of simple messages to their intended devices, they develop a backlog due to delays from hand-offs between processes running the routing instructions and processes operating the orchestration algorithm. While throttling processes may reduce the number of delays from handoffs between the routing instruction and orchestration, throttling would do little to reduce backlogs in a process queue. Therefore, it is desirable to improve message routing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
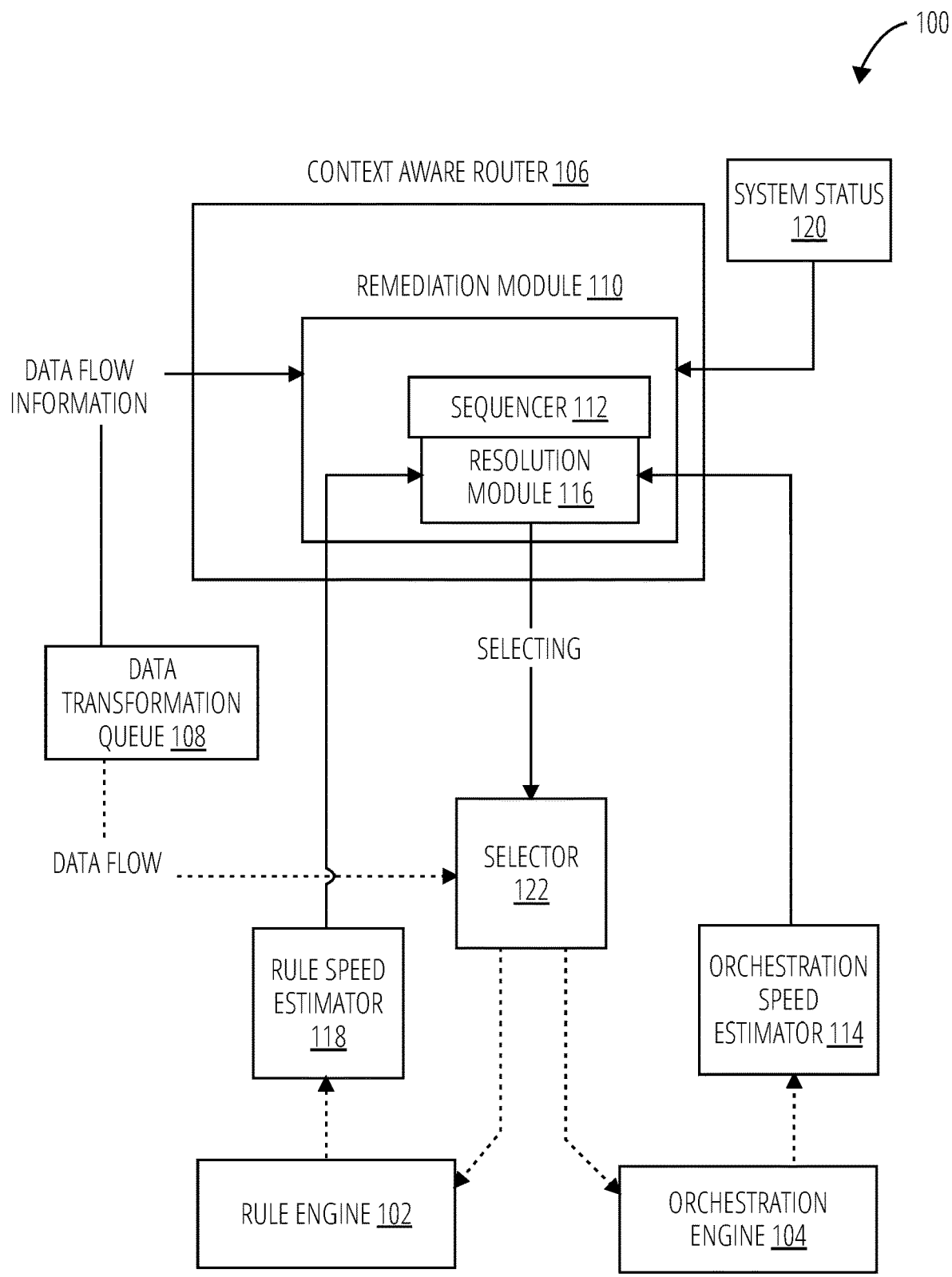
FIG. 1 illustrates an embodiment of a system operating a context based router 100.

"Algorithm speed" herein refers to information indicating process duration or expected process duration for a piece of data through an algorithm. An example of algorithm speed in a software is: If (data1.size=10 kb && processRate=100 kbps for algorithm1) data1.processDuration=0.1 s for algorithm1.

"Data information flow" herein refers to the routing path of network traffic/data.

"Data transformation queue" herein refers to a temporary queue, buffer or other data structure wherein data is temporarily held prior to transformation or processing.

"Determine Message Importance" herein refers to logic to identify priority for a received message determined by matching a field value in the received message to a corresponding priority value in a mapping table or determining the field value in the received message is above a defined threshold value. An example of software or hardware message importance determination is: IF (message.type>3) messageImportance="HIGH".

"Determine Powered State" herein refers to logic to identify power state of a device system, component system, or process is determined by matching a power state field value to a device power status in a mapping table, determining device activity at a given instance from an activity schedule, or response information from communicating with the desired device. An example of a software or hardware power state determination is: If (deviceResponse=null) device1="off"; Else IF (deviceState.active={""<2100, 0800>""}) messageTime(2010)=deviceState.active.

"Determine Response Message" herein refers to logic to identify a response message for a received message determined by matching received message data and meta data to a mapped response message. An example of response message determination is: IF_(receivedMessage (messageType="priority", sourceID="device1")) output messsage.priorityResponse.

"Determine Source" herein refers to logic to identify originating device for a received message determined by matching a field value in the received message to the corresponding device in a device mapping table. An example of a software or hardware source determination is: IF_(deviceMap.table{010:"device1"}) sourceDevice=device1 for message.sourceID(010).

"Fast data" herein refers to data identified by a logic process as having a rate of processing through an algorithm above a threshold processing rate or a higher relativistic rate of processing compared to other data pieces. An example of fast data is: IF (data1.procesDuration>dataThreshold.processDuration) data1=fastData; ELSE if (data1.processDuration>data2.processDuration) data1=fastData.

"Message Importance" herein refers to the priority for a received message as indicated by a field value in the received message which corresponds to a priority value in a mapping table, a field value in the received message that is scored in importance based on a defined threshold value. For example: IF (message.type>3) messageImportance="HIGH".

"Message processing" herein refers to routing a message to a party and performing any necessary transformations or filtering necessary for that party to receive the message.

"Message processing speed" herein refers to the rate of processing through an algorithm based on a threshold processing rate or a relativistic rate of processing compared to other data pieces. See: "Fast data" and "Slow data."

"Orchestration engine" herein refers to logic to generate action signals to define operational behavior of a device from event signals received from another system component. An example of a software orchestration engine is: IF_(input=eventSignal1) output actionSignal1.

"Orchestration speed estimator" herein refers to logic to output a time estimate for performing an operation on a set of inputs through an orchestration engine determined by system process rate calculations or comparison of the set of inputs to historical input sets associated with completion times. An example software or firmware orchestration speed estimator is: IF (orchestartionEngine.inputSet=historical.inputSet), orchestartionEngine.processDuration=historical.processDuration for historical.inputSet.

"Plan for receiving slow data" herein refers to logic for coordinating and queuing data identified with a slow processing rate through an algorithm through coordinating a delayed processing time for the data based on current process data queue. An example of planning for receiving slow data is: IF (slowData.processDuration="2.3 s") processQueue(data4:"0.1 s", data2:"0.4 s", data6:" ", data1:"2.1 s", slowData).

"Raw data" herein refers to data received from exterior data sources, which has not been Processed or transformed by the system.

"Remediation" herein refers to triaging messages based on speed, e.g. ordering a process queue determined by the estimated process duration of data through an algorithm, an example of remediation is: IF_(dataID:processDuration) processOrder(data4:"0.1 s", data2:"0.4 s", data5:" ", data1: "2.1 s").

"Remediation module" herein refers to logic to perform remediation.

"Resolution module" herein refers to logic element to generate an output for an input through comparison of a set of inputs. An example software or firmware resolution module is: IF (input.x>input.y) for input.set(x,y) output=input1(x.input); Else output=input1(y.input).

"Rule speed estimator" herein refers to logic to output a time estimate for performing an operation on a set of inputs through a rules engine as determined by system process rate calculations or comparison of the set of inputs to historical input sets associated with completion times. An example software or firmware rule speed estimator is: IF (rulesEngine.inputSet=historical.inputSet), rulesEngine.processDuration=historical.processDuration for historical.inputSet.

"Rule engine" herein refers to logic to detect events from data that is either captured or computed determined by matching data attributes to list of defined events. An example of a software or hardware rules engine is: IF (messageType="Priority") output actionMessage to device2.

"Sanity checker module" herein refers to logic to run a number of "sanity checks" as well as providing a debug view of all the messages the context aware router processes, for example, this may be a debugging console and a an additional set of rules that may be implemented to check the system's functioning.

"Selector" herein refers to a logic element that selects one of two or more inputs to its output as determined by one or more selection controls. Examples of hardware selectors are multiplexers and demultiplexers. An example software or firmware selector is: IF (selection_control=true) output=input1; else output=input2; Many other examples of selectors will be evident to those of skill in the art, without undo experimentation.

"Sequencer" herein refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Service Abstraction Layer" (SAL) herein refers to logic to provide access to services and applications. For example, a REST API.

"Slow data" herein refers to data identified by a logic process as having a rate of processing through an algorithm below a threshold processing rate or a lower relativistic rate of processing compared to other data pieces. An example of slow data is: IF (dataThreshold.processDuration>data1.procesDuration) data1=slowData; ELSE if (data2.process>Durationdata1.processDuration) data1=slowData.

"Subscribed entities" herein refers to edge devices or other devices or services which are subscribed to a particular event.

"System state" herein refers to information indicating activity of software or hardware processes operating on a system determined by matching a system state information field value to a system state in a mapping table or determining system state at a given instance from a schedule.

"Time estimate backlog" herein refers to process queue for data missing estimated process duration through an algorithm. An example of software time estimate backlog is: IF (dataID:processDuration) processEstmationOrder (data1:" ", data2:" ", data3:" ").

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

"Circuitry" herein refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" herein refers to software logic embodied as processor-executable instructions stored in read-only memories or media.

"Hardware" herein refers to logic embodied as analog or digital circuitry.

"Logic" herein refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" herein refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" herein refers to logic implemented as processor-executable instructions in a machine memory (e.g. read/write volatile or nonvolatile memory or media).

A system is disclosed to collect data from edge devices and to adapt the devices to improve their semi-autonomous operation. Conventional systems of this nature are complex and inflexible. The current system may be driven entirely remotely and/or locally and has a flexible architecture that can easily be modified to port onto different hardware platforms and operating systems, use available network connectivity on the target device, and use a protocol that is best utilized by the back end system.

A system for context aware routing involves one or more service abstraction layers receiving one or more input control signals. A router transforms the one or more input control signals into one or more message control signals. A rules interpretation component transforms the one or more message control signals into one or more rule control signals. A network abstraction layer receives the one or more message control signals, the network abstraction layer transforming the one or more message control signals into a network control signal, the network abstraction layer sending the network control signal to affect a machine state of one or more machines.

The system for context aware routing may include a sanity testing component receiving a sanity test setup control signal, the sanity test setup control signal altering the sanity testing component to send a sanity test control signal to the router. A periodic rules setup control signal alters the periodic message component to send a periodic rules control signal to the router.

The system for context aware routing may include a threshold detecting component receiving a threshold setup control signal, the threshold setup control signal comprising one or more thresholds, the threshold detecting component receiving the one or more message control signals, the threshold detecting component transforming the one or more message control signals into one or more threshold signals in response to the one or more thresholds being exceeded.

One or more input/output devices send the one or more input control signals to the router, the one or more input/output devices receiving the one or more message control signals from the router, the machine state of the one or more input/output devices altered by the one or more message control signals.

The one or more input/output devices send an initiation control signal to the router, the initiation control signal comprising instructions for the router to receive the one or more input control signals and send the one or more message control signals to the one or more input/output devices.

The system for context aware routing may include one or more interface abstraction layers. The system for context aware routing may include a power management component. The router comprises a message control signal receiver and a message control signal sender. The message control signal sender sends the one or more message control signals to the one or more service abstraction layers. The message control signal sender sends the one or more message control signals to the network abstraction layer.

Referencing FIG. 1, the system operating a context based router 100 executes on rules that can operate very quickly and determines which algorithms (e.g., rule engine 102, orchestration engine 104) to shunt data to, based on a variety of factors such as traffic (data flow) and the speed of a given rule or orchestration. The remediation module may also plan for data that will take a long time to process on certain algorithms. It knows it will have to process the "slow" data through one algorithm, while some other data may be processed a in a different way.

The system operating a context based router 100 comprises a context aware router 106, a data transformation queue 108, a rule engine 102, a rule speed estimator 118, an orchestration engine 104, an orchestration speed estimator 114, and a selector 122. The context aware router 106 comprises a remediation module 110 comprising a sequencer 112 and a resolution module 116. The remediation module 110 communicates with system status 120. The data transformation queue 108 communicates data flow information to the remediation module 110. The rule speed estimator 118 communicates the estimated speed to process data flow through the rule engine 102 to the resolution module 116. The orchestration speed estimator 114 communicates the estimated speed to process data flow through the orchestration engine 104 to the resolution module 116. The sequencer 112 orders data flow in accordance with processing speed. The resolution module 116 communicates a selecting signal to the selector 122 to select the rule engine 102 or the orchestration engine 104 to receive the data flow. The selector 122 receives a data flow from the data transformation queue 108.

Figure 2:
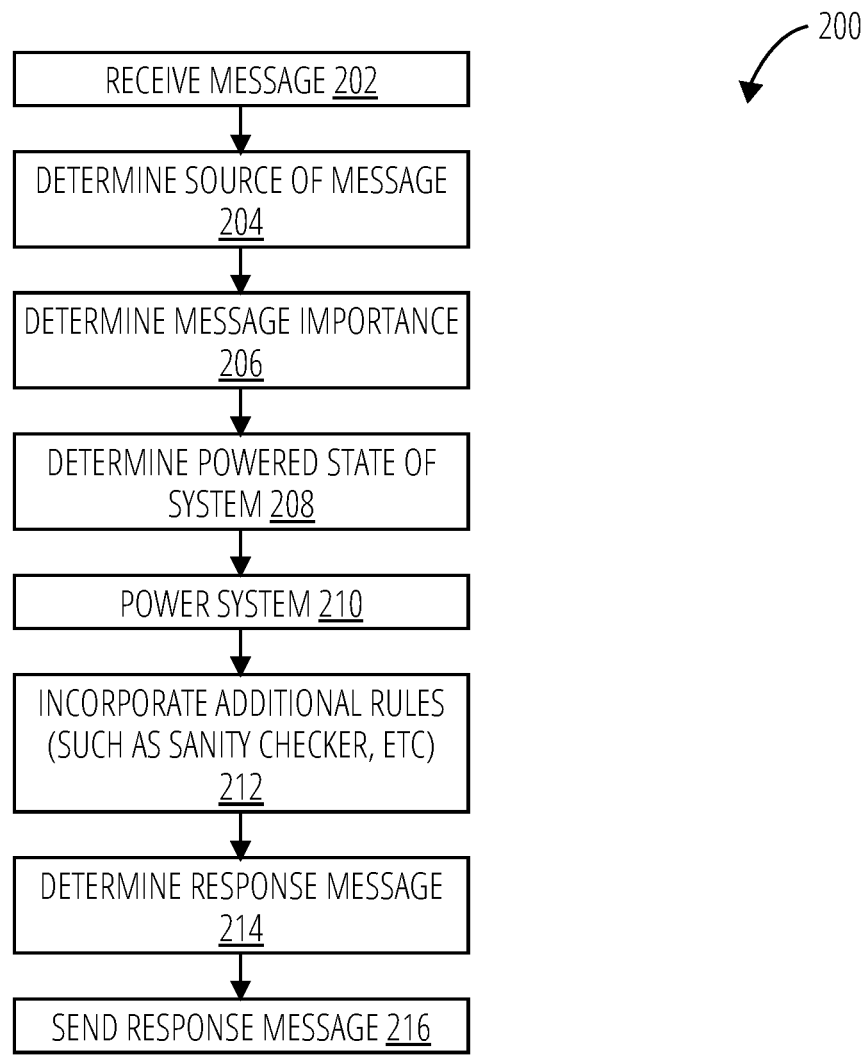
FIG. 2 illustrates an embodiment of a message handling process 200 for a context based router.
Figure 3:
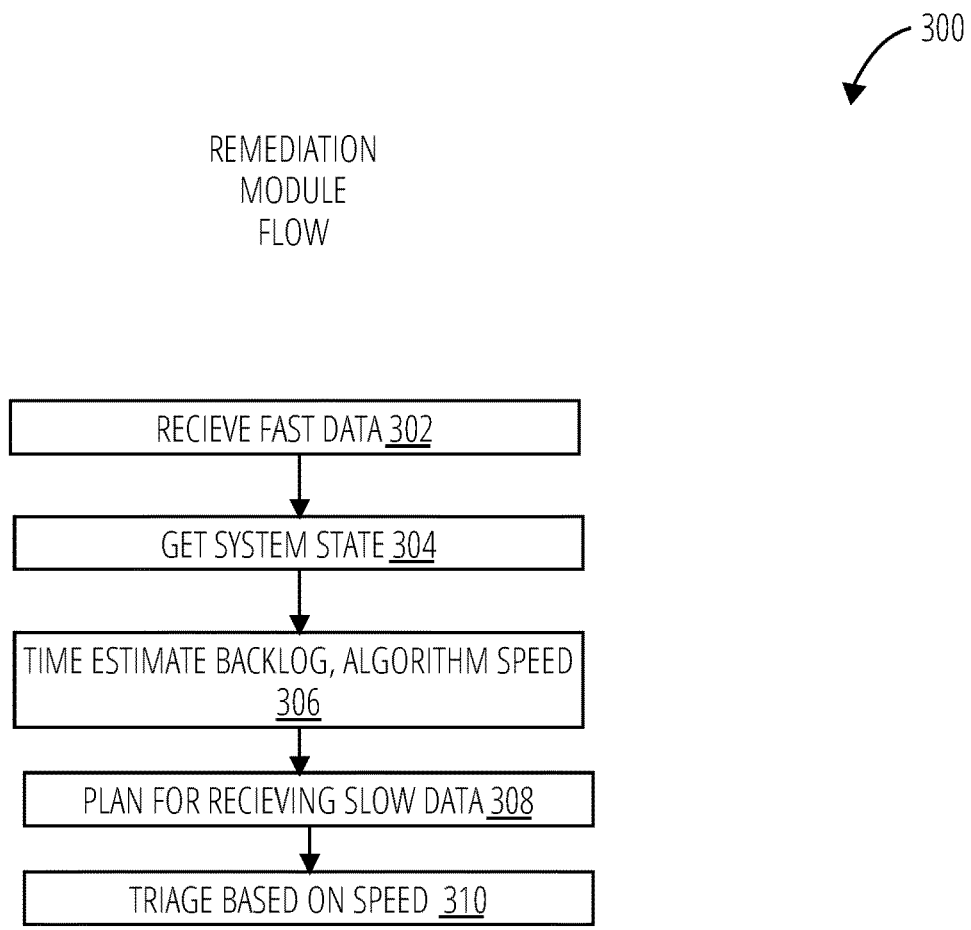
FIG. 3 illustrates an embodiment of a remediation module operation 300.
Figure 6:
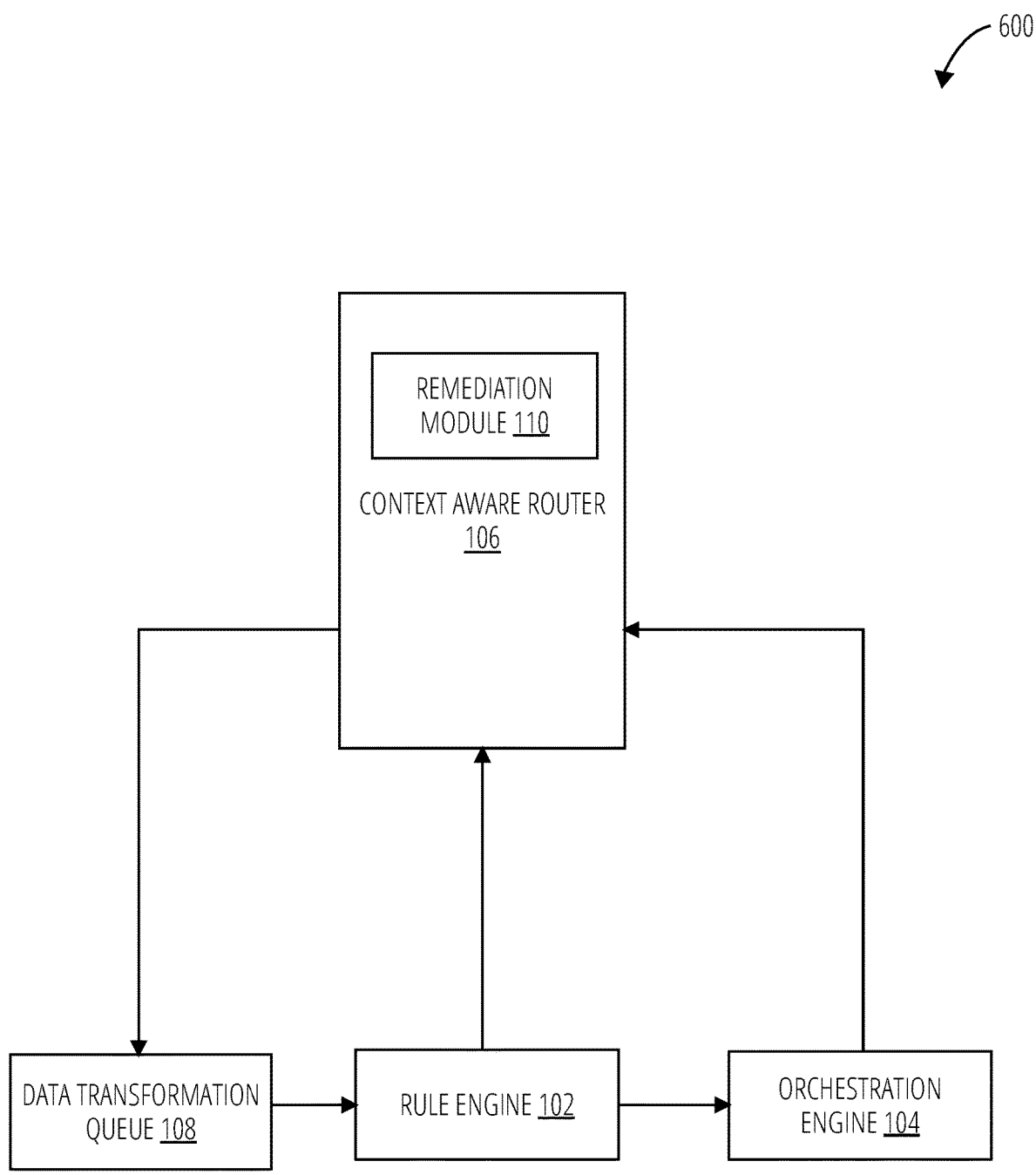
FIG. 6 illustrates an embodiment of a system 600 implementing context based routing.

The system operating a context based router 100 may be operated in accordance with the process described FIG. 6, FIG. 2, and FIG. 3.

Referencing FIG. 2, a message handling process 200 receives messages from a system component and transfer those messages to the message handler to be processed (block 202). In block 204, the message handling process 200 determines the source of the message by identifying an originating device. In block 206, the message handling process 200 determines the importance of the message for each message, and the context based routing processes it against the routing table. The message is passed on to all parties who have registered with the context based routing, and who are interested in the message being processed. In block 208, the message handling process 200 determines the powered state of the system. In block 210, the message handling process 200 powers the system. In block 212, the message handling process 200 incorporates additional rules (e.g., sanity checker, etc.). In block 214, the message handling process 200 determines a response message. Components register with the context based routing to indicate that they are interested in messages (e.g., sending, receiving, processing, etc.). The context based routing stores all of these registrations into a routing table. For each message, the context based routing processes it against the routing table. The message is passed on to all parties who have registered with the context based routing, and who are interested in the message being processed. The message handler determines the system component to send a message received from the data transformation queue and sends the message to that component. In block 216, the message handling process 200 sends the response message.

Referencing FIG. 3, a remediation module operation 300 receives fast data (block 302). In block 304, the remediation module operation 300 retrieves the system state. In block 306, the remediation module operation 300 analyzes the queue for time estimate backlog and the algorithm speed for the queued data. In block 308, the remediation module operation 300 plans for receiving the slow data. In block 310, the remediation module operation 300 performs triage on the queue based on estimated processing speed without metering processing rate.

Figure 4:
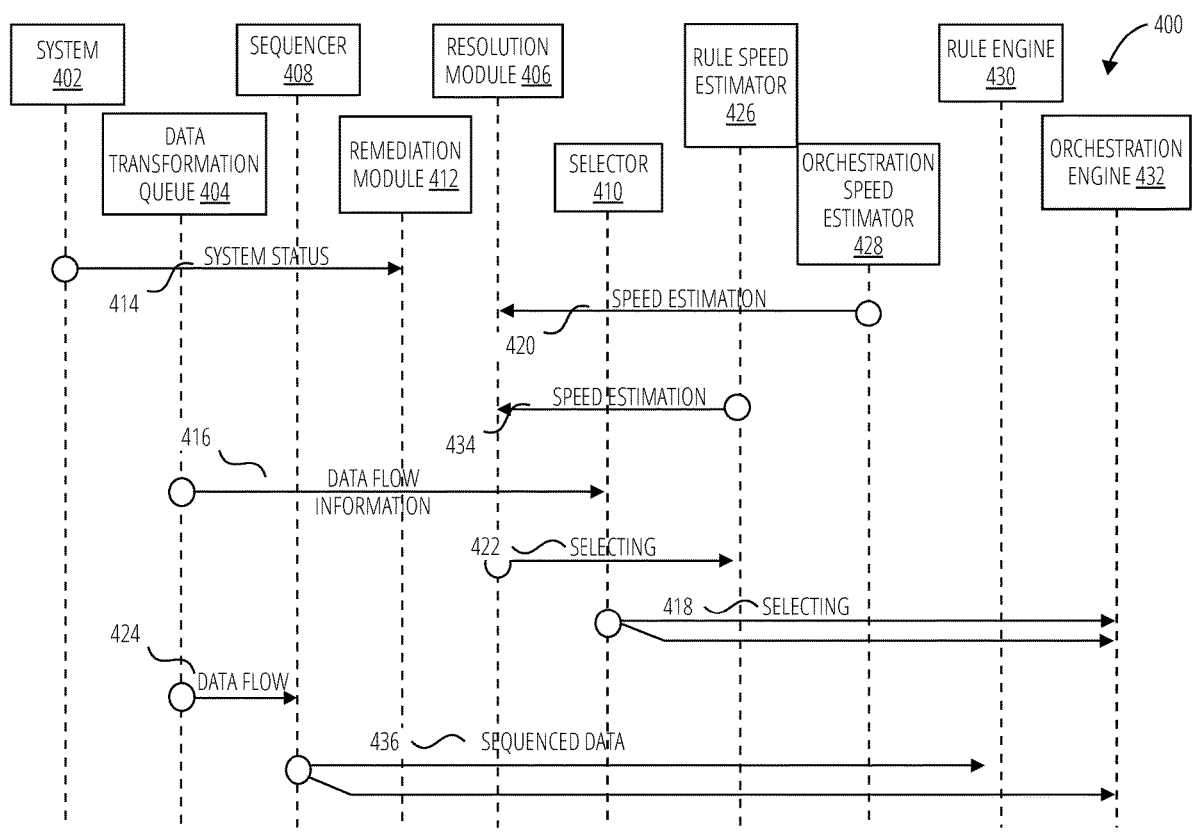
FIG. 4 illustrates a process for context aware routing 400 in accordance with one embodiment.

Referencing FIG. 4, a process for context aware routing 400 comprises a system 402, a data transformation queue 404, a resolution module 406, a sequencer 408, a selector 410, a remediation module 412, a system status 414, a data flow information 416, a selecting 418, a speed estimation 420, a selecting 422, a data flow 424, a rule speed estimator 426, an orchestration speed estimator 428, a rule engine 430, an orchestration engine 432, a speed estimation 434, and a sequenced data 436.

The remediation module 412 receives the system status 414 from the system 402.

Figure 5:
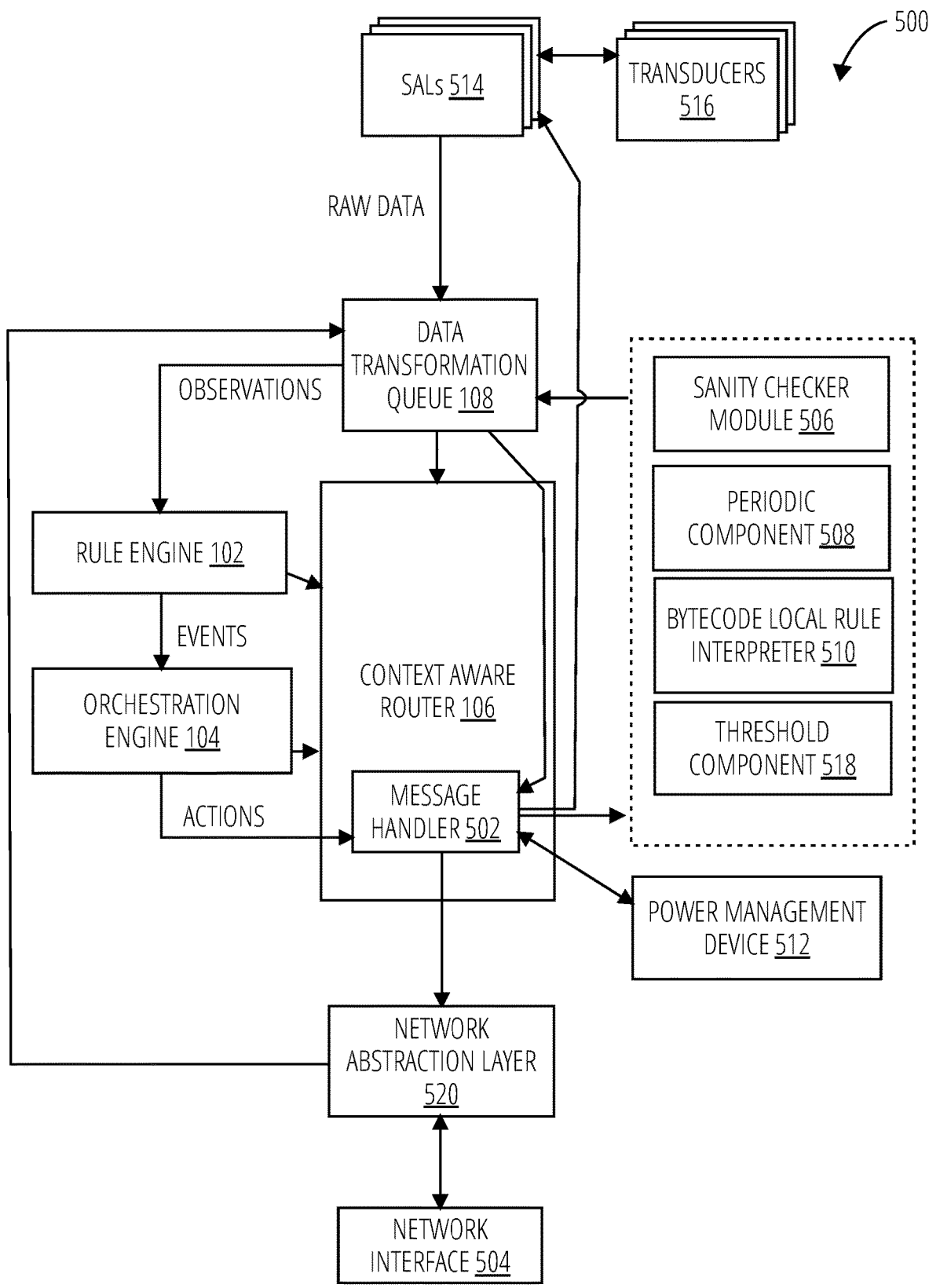
FIG. 5 illustrates an embodiment of a rules implementation system 500.

Referring to FIG. 5, a rules implementation system 500 comprises a rule engine 102, an orchestration engine 104, a context aware router 106, a data transformation queue 108, a message handler 502, a network interface 504, a sanity checker module 506, a periodic component 508, a bytecode local rule interpreter 510, a power management device 512, SALs 514, transducers 516, a threshold component 518, and a network abstraction layer 520.

The context aware router 106 may comprise the data transformation queue 108 and the message handler 502. The data transformation queue 108 may receive messages from system components and transfer those messages to the message handler 502 to be processed. The message handler 502 determines the system component to send a message received from the data transformation queue 108 and sends the message to that component. The context aware router 106 may process messages by processing all the available messages in the data transformation queue 108. The context aware router 106 may handle all the messages in the system. The messages are passed into the context aware router 106 and put into a single queue, data transformation queue 108. The context aware router 106 may process these on a simple first-in, first-out basis. Components register with the context aware router 106 to indicate that they are interested in messages (e.g., sending, receiving, processing, etc.). This includes internal components (e.g., the LED SAL component may register to indicate that LED messages are of interest), and external sources (e.g., an external source may ask to be notified of button messages or specific changes). The context aware router 106 stores all of these registrations into a routing table. For each message, the context aware router 106 processes it against the routing table. The message is passed on to all parties who have registered with the context aware router 106, and who are interested in the message being processed. There is a function that allows objects to filter messages at a high level, so that objects in the system do not have to inspect and process all messages.

The messages passed around the system include fields, such as, a SourceID, the message origin; MessageType (e.g., Get, Set, Response, Callback Request, etc.); ServiceID, the service the message pertains to; TopicID, the topic the message pertains to; AttributeID the attribute the message pertains to; and Value, the associated value of the attribute. Some of these fields may be optional for certain message types. Messages carry data and commands between the various components that comprise the system. There is an internal representation of a message that is used by software and an external representation that is sent across networks using a message bus. Messages may be converted from internal and external representation when entering or exiting the network layer.

An internal message is composed of a set of header fields and a set of payload fields. The header defines the intent of the message while the payload contains the data required to define that intent. Header fields define the purpose and recipient of a message and may include: Identifier; Type; Timestamp; Correlation Identifier; Source; Destination; and Quality of Service.

An external message may utilize a common messaging format to define the supported requests and responses that can be made. This message format may be transparent to the underlying network protocol. An external message may be a request or a response. Requests are sent to an edge device to retrieve a value or perform an action. Responses are sent from an edge device to return the result of a Request.

A message contains a set of common header fields, including: message ID and message type, such as 0—Topic Get Request, 1—Topic Set Request, 2—Operation Request, 3—Report Request, 4—Topic Set Response, 5—Topic Get Response, 6—Report Response, 7—Command Response, 8—Internal Indication, and 9—Byte Code message; a source, which is an identifier of the source of the message, and which may be set by the client or added by the gateway that handles the initial message; a timestamp, which may be set by the client or added by the gateway that handles the initial message; quality of service, which is the quality of service level associated with the message, and which may be 0, 1, or 2; and an authentication.

Response messages may add additional headers including: success (the result of the corresponding request message, wherein true indicates that the request was successful and false indicates that it was not; a failed response may not comprise a payload); a correlation ID (the messages that are sent in response to a request sets the correlation ID of the message to that of the requests message ID. The correlation ID may be used by the central control 704 to ensure that response messages are coordinated appropriately to ensure that the control commands and rule updates are generated appropriately. For example, the correlation ID may be used to determine that data from one transducer of the transducers 516 was not generated on a specific time interval or in a specific location.

Messages can be encapsulated in a number of different formats, including JSON. JSON message fields may include: "0" message ID; "1" Message Type; "2" Service ID; "3" Topic ID; "5" Attribute List; "6" Correlation ID; and "7" Success Attribute. Messages can be serialized using JSON for transmission across the network. An example of a set request message follows:

```
{
"0": 1,
"1": 1,
"2": 1,
"3": 2,
"5": [ {"1015": 1} ]
}
```

The network interface 504 may abstract away the external communications interface to the outside world. When the network interface 504 is created, it may be configured to use a certain connection type, transport protocol, and destination (e.g., a listening server or message broker). The network interface 504 decodes incoming messages and encodes the outgoing messages in relation to the specific protocol being used in the system (e.g., MQTT-SN, HTTP, etc.). The network interface 504 registers with the context aware router 106 and sends any messages that are not of type 'internal' out via a connected mechanism. The network interface 504 is implemented in a componentized way by one or more IALs (Interface Abstraction Layers) to allow a swap between different hardware interfaces. In some embodiments, an IAL may be present for each type of network interfaced with the rules implementation system 500 (e.g., Wifi, GRPS, etc.) The framework may support multiple IALs concurrently to allow several communications channels to be used. If there is more than one IAL, the network abstraction layer 520 may arbitrate and prioritize how messages are sent and received.

The sanity checker module 506 provides a way of running a number of sanity tests as well as providing a debug view of all the messages the context aware router 106 processes. The sanity checker module 506 implements some simple test cases for each of the SALs 514. These test cases may typically post a get request message and will then check the response message ensuring that the message returned is correctly formatted and that the data is within predetermined bounds. If the message is incorrectly formatted or the data is not within predetermined bounds, a notification message is created and sent by the system to a notification device. Tests may be set_up by adding them to the test queue in the construction of the sanity checker module 506, which then automatically starts the tests as soon as the main processing loop begins. The sanity checker module 506 checks the get response messages of each of the SALs 514 and ensures they are correctly formatted and have valid values in them. The sanity checker module 506 also reports all messages that go through the system, and in some cases, such as get response messages, it also reports the attributes contained within that message. Reports from the sanity checker module 506 may be printed across a serial port.

The periodic component 508 allows regular controlling and reporting of data readings. The periodic component 508 issues requests for the SALs 514 to perform actions at regular time intervals. For example, it could inform a GPS SAL to send a location report every 600 seconds, or for the LED SAL to change color every 10 seconds. The periodic component 508 is configured to issue periodic events by sending a message with a 'periodic' attribute. The periodic component 508 captures the messages with this attribute and re-transmits appropriate messages at the requested interval. For example, to request a temperature reading every 10 seconds: first, an external entity sends a message into the rules implementation system 500 to request the temperature on a 10 second periodical basis; second, the temperature SAL will ignore this message (even though the Service_ID and Topic_ID suggest the message is destined for the temperature SAL, it is not of the right 'type'), but the periodic component 508 captures and stores the message; third, the periodic component 508 will issue messages to ask the temperature SAL to report temperature, doing so every 10 seconds. To cease the periodic reporting, an entity sends a message requesting the period on a 0 interval basis. The periodic component 508 may handle more than one periodic request at the same time. It may store the periodic requests in a table and keep track of when messages are due.

The bytecode local rule interpreter 510 is a bytecode interpreter that may be configured with bytecode from the main rules engine, essentially allowing defined rules to be processed on the device. The bytecode messages share a common message format, which may be: {message ID, message Type, Service ID, Bytecode message Header, Bytecode Script}. An exemplary message may be: {"0":44, "1":9, "2":0, "10":[13354593, 0, 1], "9"[{"8":19}, {"1":0}, {"8":18}]}.

The bytecode message header field indicates extra data about the message; it may comprise 3 fields, the unique id of the rule, the type of bytecode message, and an optional field. Bytecode message types may include: Master Rule message—0; Predicate message—1; Consequence message—2; Header message—3; and Footer message—4. The optional field encodes different data depending on the message type. The optional field for each bytecode message type may comprise: Master Rule message—Number of predicates; Predicate message—Predicate Index; Consequence message—Number of predicates; Header message—Timestamp; and Footer message—Number of rules.

The header and footer messages may not comprise a bytecode script. A bytecode script is made up of collections of pairs of data that indicate a data type and its value (e.g., {"8":19}, wherein "8" indicates the data type, here 8 represents a bytecode and the second value, 19, indicates the bytecode instruction to be performed).

The power management device 512 is configured to wake up on appropriate events and then put the rules implementation system 500 into a low power state.

Each of the SALs 514 encapsulates the capture and/or control functionality behind a single hardware input/output device, or another part of the system (e.g., wear information, system health, sales data, faults, etc.). The SALs 514 may be grouped in some way (e.g., Hardware SALs 514, Software SALs 514). In some cases, a single hardware device (with multiple bits of I/O) may have multiple SALs 514. For example, a thermostat with a temperature sensor and a warning LED may have 2 SALs 514, one for the temperature sensor and one for the LED. The SALs 514 handle Get/Set requests to the sensors. The SALs 514 may send and receive messages and do so via the context aware router 106 object. If an interrupt occurs, the sensor associated with that interrupt will typically post a message to the context aware router 106. In those cases where the handling of the interrupt needs to be deferred (and possibly for all cases), the SALs 514 may post a 'Callback' message so that the context aware router 106 returns to the SALs 514 to complete the interrupt processing when no further interrupts are pending.

The transducers 516 may comprise a single hardware input/output device. Each of the transducers 516 may be associated with one or more of the SALs 514. The transducers 516 may send a signal to the SALs 514 indicating a specific machine state and receive a signal to alter the machine state in response to that signal.

The threshold component 518 allows for the reporting of data readings when those data readings are outside a particular range.

The network abstraction layer 520 may receive messages from the message handler 502 and the network interface 504, and send messages to the data transformation queue 108 and the network interface 504.

Referencing FIG. 6, the system 600 involves the context aware router 106 communicating a control signal to the data transformation queue 108. The data transformation queue 108 communicates a data flow to the rule engine 102. The rule engine 102 detects an event in the data flow from the data transformation queue 108. The rule engine 102 communicates with the context aware router 106 processing estimates for the data flow. The rule engine 102 communicates an event signal to the orchestration engine 104. The orchestration engine 104 receives event signals from the rule engine 102 and generates control signals. The orchestration engine 104 communicates with the processing estimates for performing action for the generated control signals. Rule engine and orchestration engine are conventional algorithms. Usually, systems implement either a rules engine or orchestration engine. The system 600 employs both the rules engine and the orchestration engine to implement context based routing.

The system 600 may be operated in accordance with the process described in FIG. 2 and FIG. 3.

Figure 7:
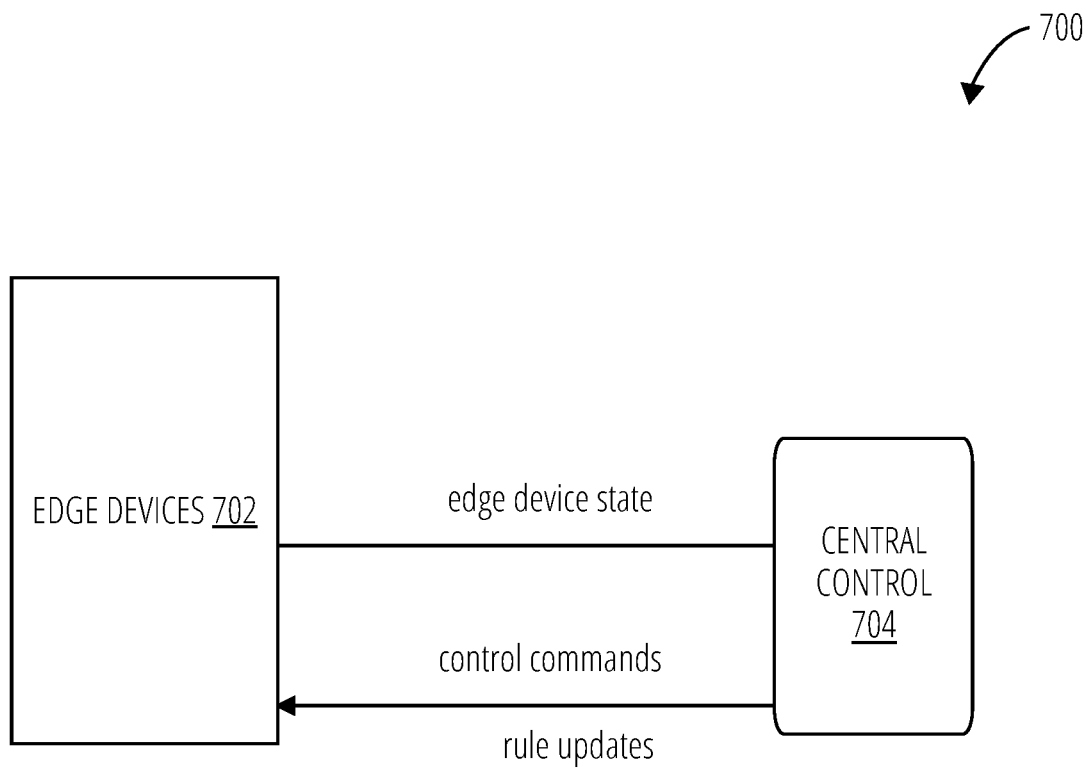
FIG. 7 illustrates an embodiment of a rules implementation system 700.

Referring to FIG. 7, a rules implementation system 700 comprises edge devices 702 and a central control 704.

The edge devices 702 communicate an edge device state to the central control 704. The edge devices 702 may communicate with the central control 704 directly or via a network (e.g., routers, hubs, servers, gateways, network bridges, modems, wireless access points, networking cables, line drivers, switches, and repeaters, including hybrid network devices such as multilayer switches, protocol converters, bridge routers, proxy servers, firewalls, network address translators, multiplexers, network interface controllers, wireless network interface controllers, ISDN terminal adapters, WAN, LAN, WWW, etc.).

The central control 704 communicates control commands and rule updates to the edge devices 702. The central control 704 may communicate directly or via a network.

The edge device state, control commands, and the rule updates may be communicated using various network protocols including MQTT, a lightweight publish/subscribe messaging transport that may utilize a message broker to route messages; MQTT-SN, a connectionless publish/subscribe messaging transport designed for low bandwidth unreliable communication environments, which may be easily integrated with MQTT using a MQTT-SN to MQTT Bridge; AMQP 1.0, a full publish/subscribe messaging protocol that provides topics, queues, full message routing and a well-defined security model; HTTP, the standard client/server protocol of the World Wide Web; and CoAP, a RESTful client/server protocol for resource constrained devices and networks, which may be integrated with HTTP using a CoAP to HTTP Bridge.

Figure 8:
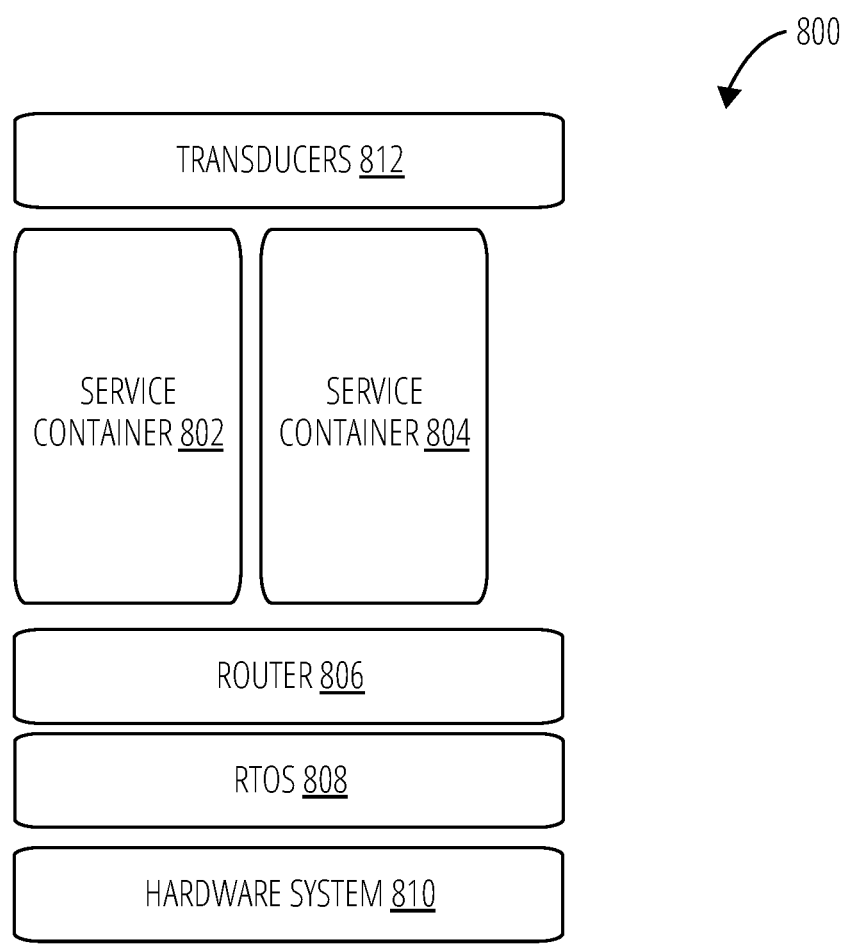
FIG. 8 illustrates an embodiment of a rules implementation system 800.

Referring to FIG. 8, a rules implementation system 800 comprises a service container 802, a service container 804, a router 806, an RTOS 808, a hardware system 810, and transducers 812. In some embodiments, the edge devices 702 comprise the rules implementation system 800.

The service container 802 and the service container 804 may run applications that send and receive data from the transducers 812. The router 806 operates the service container 802 and the service container 804 to send and receive data from the transducers 812. The RTOS 808 may coordinate resources on the hardware system 810 and may provide resources to the router 806. The hardware system 810 comprises physical components that may store the RTOS 808 and may provide resources, such as, electricity via internal sources (e.g., battery) or converting an external energy source into electricity (e.g., transformer, solar cell, etc.).

The transducers 812 may convert physical phenomenon into signals. The signals may be sent to the service container 802 and/or the service container 804. Signals may be received from the service container 802 and the service container 804 to generate data regarding the physical phenomenon and send a signal to the service container 802 and/or the service container 804 in response.

Figure 9:
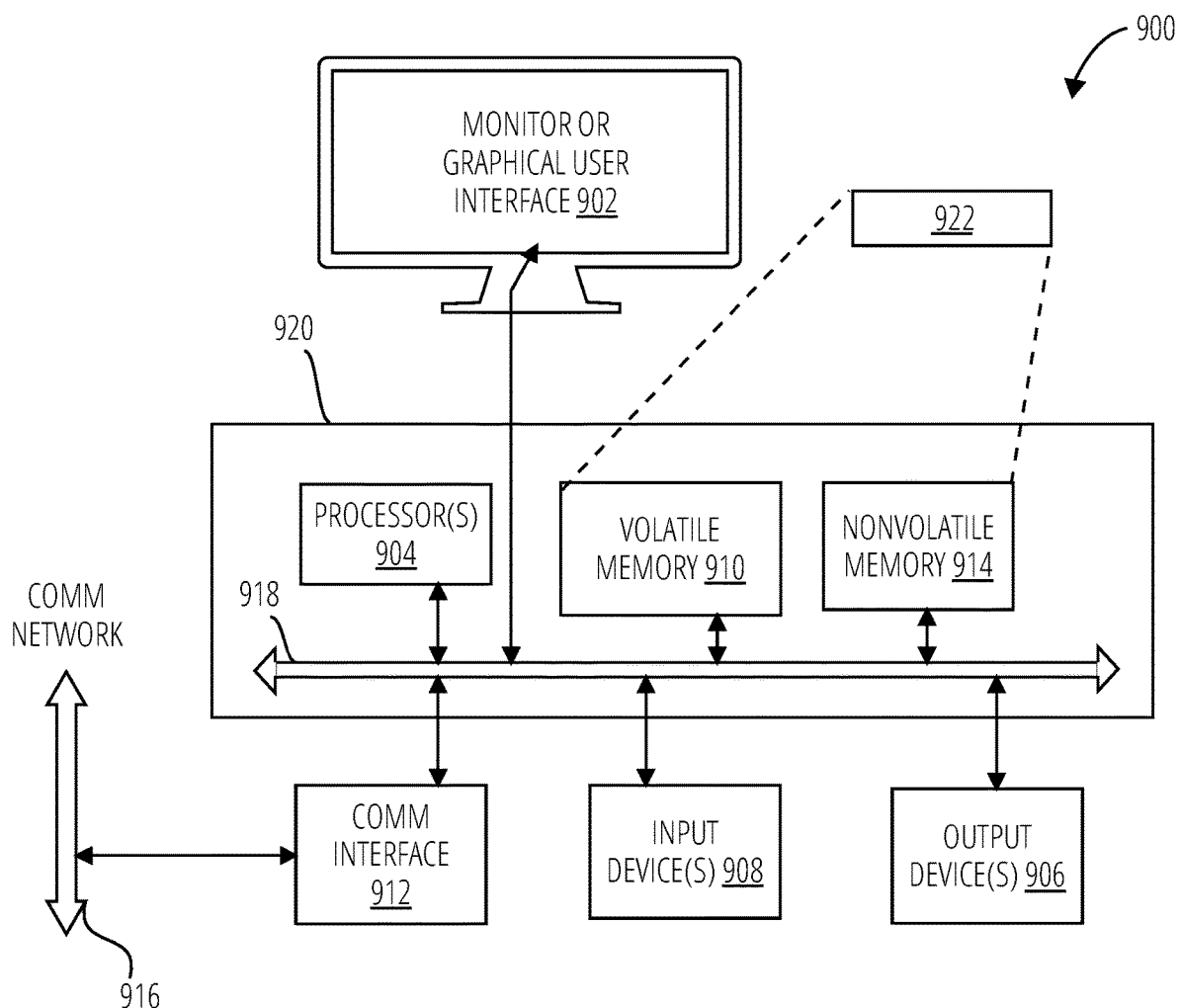
FIG. 9 is an example block diagram of a central control system 900 that may incorporate embodiments of the present invention.

FIG. 9 is an example block diagram of a central control system 900 that may incorporate embodiments of the present invention. FIG. 9 is merely illustrative of a machine system to carry out aspects of the technical processes described herein, and does not limit the scope of the claims. One of ordinary skill in the art would recognize other variations, modifications, and alternatives. In one embodiment, the central control system 900 typically includes a monitor or graphical user interface 902, a data processing system 920, a communication network interface 912, input device(s) 908, output device(s) 906, and the like.

As depicted in FIG. 9, the data processing system 920 may include one or more processor(s) 904 that communicate with a number of peripheral devices via a bus subsystem 918. These peripheral devices may include input device(s) 908, output device(s) 906, communication network interface 912, and a storage subsystem, such as a volatile memory 910 and a nonvolatile memory 914.

The volatile memory 910 and/or the nonvolatile memory 914 may store computer-executable instructions and thus form logic 922 that, when applied to and executed by the processor(s) 904, implements embodiments of the processes disclosed herein.

The input device(s) 908 include devices and mechanisms for inputting information to the data processing system 920. These may include a keyboard, a keypad, a touch screen incorporated into the monitor or graphical user interface 902, audio input devices such as voice recognition systems, microphones, and other types of input devices. In various embodiments, the input device(s) 908 may be embodied as a computer mouse, a trackball, a track pad, a joystick, wireless remote, drawing tablet, voice command system, eye tracking system, and the like. The input device(s) 908 typically allow a user to select objects, icons, control areas, text and the like that appear on the monitor or graphical user interface 902 via a command such as a click of a button or the like.

The output device(s) 906 include devices and mechanisms for outputting information from the data processing system 920. These may include speakers, printers, infrared LEDs, and so on as well understood in the art.

The communication network interface 912 provides an interface to communication networks (e.g., communication network 916) and devices external to the data processing system 920. The communication network interface 912 may serve as an interface for receiving data from and transmitting data to other systems. Embodiments of the communication network interface 912 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 912 may be coupled to the communication network 916 via an antenna, a cable, or the like. In some embodiments, the communication network interface 912 may be physically integrated on a circuit board of the data processing system 920, or in some cases may be implemented in software or firmware, such as "soft modems", or the like.

The central control system 900 may include logic that enables communications over a network using protocols such as HTTP, TCP/IP, RTP/RTSP, IPX, UDP and the like.

The volatile memory 910 and the nonvolatile memory 914 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 910 and the nonvolatile memory 914 may be configured to store the basic programming and data constructs that provide the functionality of the disclosed processes and other embodiments thereof that fall within the scope of the present invention.

Logic 922 that implements embodiments of the present invention may be stored in the volatile memory 910 and/or the nonvolatile memory 914. Said software may be read from the volatile memory 910 and/or nonvolatile memory 914 and executed by the processor(s) 904. The volatile memory 910 and the nonvolatile memory 914 may also provide a repository for storing data used by the software.

The volatile memory 910 and the nonvolatile memory 914 may include a number of memories including a main random access memory (RAM) for storage of instructions and data during program execution and a read only memory (ROM) in which read-only non-transitory instructions are stored. The volatile memory 910 and the nonvolatile memory 914 may include a file storage subsystem providing persistent (non-volatile) storage for program and data files. The volatile memory 910 and the nonvolatile memory 914 may include removable storage systems, such as removable flash memory.

The bus subsystem 918 provides a mechanism for enabling the various components and subsystems of data processing system 920 communicate with each other as intended. Although the communication network interface 912 is depicted schematically as a single bus, some embodiments of the bus subsystem 918 may utilize multiple distinct busses.

It will be readily apparent to one of ordinary skill in the art that the central control system 900 may be a device such as a smartphone, a desktop computer, a laptop computer, a rack-mounted computer system, a computer server, or a tablet computer device. As commonly known in the art, the central control system 900 may be implemented as a collection of multiple networked computing devices. Further, the central control system 900 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Figure 10:
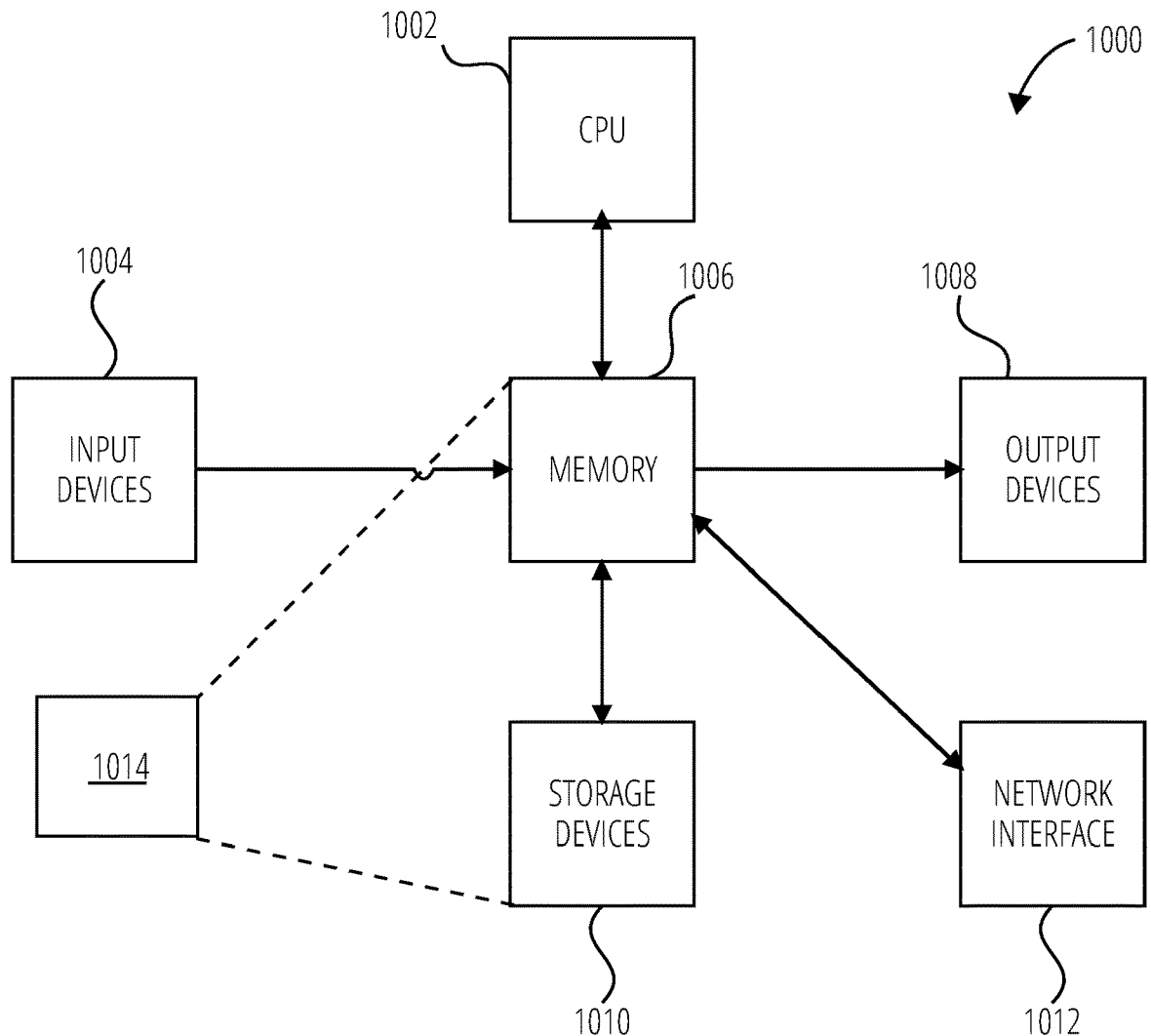
FIG. 10 illustrates an embodiment of an edge device 1000 to implement components and process steps of the system described herein.

FIG. 10 illustrates an embodiment of an edge device 1000 to implement components and process steps of the system described herein.

Input devices 1004 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1004 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1004 are provided via various machine signal conductors (e.g., busses or network interfaces) and circuits to memory 1006.

The memory 1006 is typically what is known as a first or second level memory device, providing for storage (via configuration of matter or states of matter) of signals received from the input devices 1004, instructions and information for controlling operation of the CPU 1002, and signals from storage devices 1010.

The memory 1006 and/or the storage devices 1010 may store computer-executable instructions and thus forming logic 1014 that when applied to and executed by the CPU 1002 implement embodiments of the processes disclosed herein.

Information stored in the memory 1006 is typically directly accessible to the CPU 1002 of the device. Signals input to the device cause the reconfiguration of the internal material/energy state of the memory 1006, creating in essence a new machine configuration, influencing the behavior of the edge device 1000 by affecting the behavior of the CPU 1002 with control signals (instructions) and data provided in conjunction with the control signals.

Second or third level storage devices 1010 may provide a slower but higher capacity machine memory capability. Examples of storage devices 1010 are hard disks, optical disks, large capacity flash memories or other non-volatile memory technologies, and magnetic memories.

The CPU 1002 may cause the configuration of the memory 1006 to be altered by signals in storage devices 1010. In other words, the CPU 1002 may cause data and instructions to be read from storage devices 1010 in the memory 1006 from which may then influence the operations of CPU 1002 as instructions and data signals, and from which it may also be provided to the output devices 1008. The CPU 1002 may alter the content of the memory 1006 by signaling to a machine interface of memory 1006 to alter the internal configuration, and then converted signals to the storage devices 1010 to alter its material internal configuration. In other words, data and instructions may be backed up from memory 1006, which is often volatile, to storage devices 1010, which are often non-volatile.

Output devices 1008 are transducers which convert signals received from the memory 1006 into physical phenomenon such as vibrations in the air, or patterns of light on a machine display, or vibrations (i.e., haptic devices) or patterns of ink or other materials (i.e., printers and 3-D printers).

The network interface 1012 receives signals from the memory 1006 and converts them into electrical, optical, or wireless signals to other machines, typically via a machine network. The network interface 1012 also receives signals from the machine network and converts them into electrical, optical, or wireless signals to the memory 1006.

What is claimed is:

1. A method for context-aware routing comprising:
    receiving raw data with a data transformation queue;
    configuring a message handler with a routing table to determine the raw data's source, message importance, subscribed entities, and at least one response message for transmission to the subscribed entities;
    determining data information flow with a remediation module by:
        obtaining an overall system state;
        utilizing a rule speed estimator and an orchestration speed estimator to estimate message processing speeds;
        generating a selection signal with a resolution module to operate a selector to select a data processor, from between a rule engine and an orchestration engine, to process the raw data;
        ordering the raw data with a sequencer to set a data processing order for the raw data based on processing speed for logic assigned to process the raw data; and
        configuring the data processor with the data processing order to retrieve the raw data from the data transformation queue and process the raw data; and
    determining the response message from the routing table and transmitting the response message to operate the subscribed entities in response to receiving the raw data.

2. The method for context-aware routing of claim 1 wherein the response message further comprises header fields and payload fields.

3. The method for context-aware routing of claim 1 wherein the data transformation queue applies additional data processing modules to process the raw data.

4. The method for context-aware routing of claim 3 wherein applying the additional data processing modules further comprises:
    applying a sanity checker module;
    applying a periodic component;
    applying a bytecode local rule interpreter; and
    applying a threshold component.

5. The method for context-aware routing of claim 3 wherein the data transformation queue receives the raw data from a Service Abstraction Layer.

* * * * *